Dec. 17, 1957  A. G. BROWN  2,816,320
MEAT-PERFORATING APPARATUS
Filed June 17, 1954  4 Sheets-Sheet 1
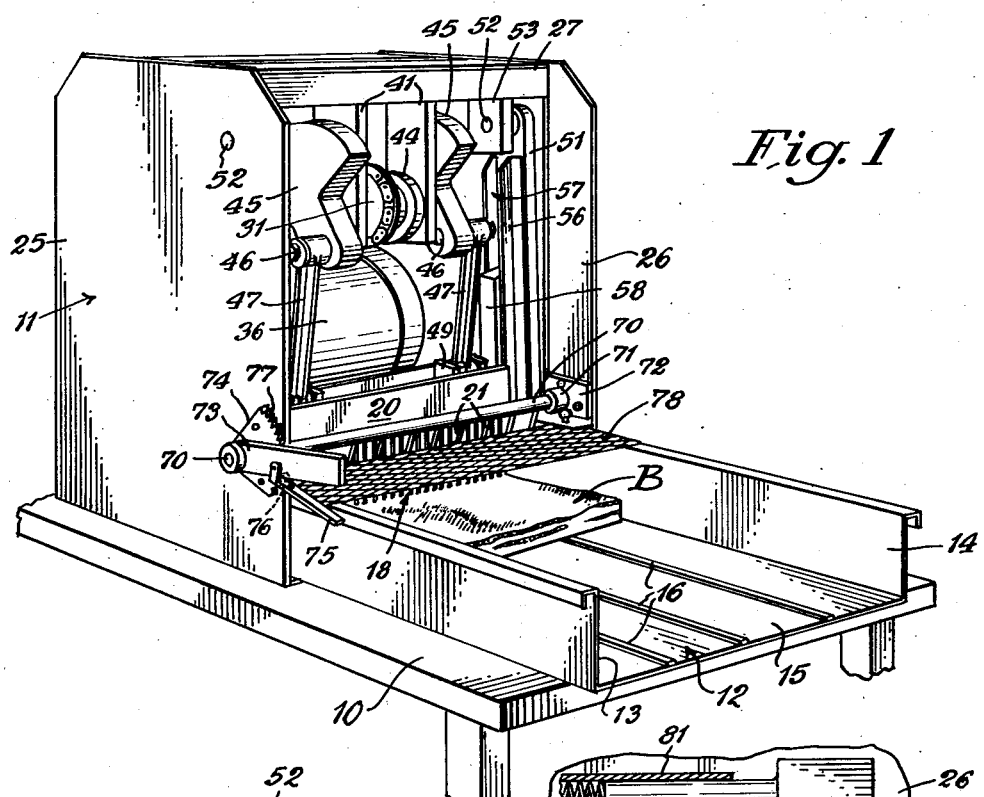
Fig. 1
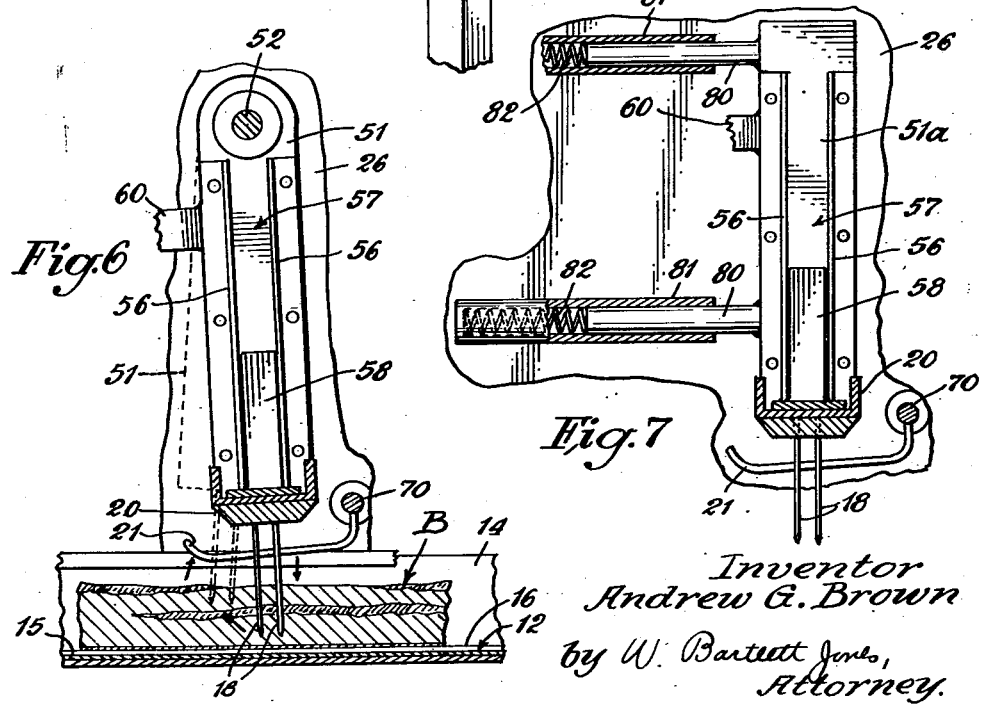
Fig. 6
Fig. 7
Inventor
Andrew G. Brown
by W. Bartlett Jones,
Attorney.

Dec. 17, 1957  A. G. BROWN  2,816,320
MEAT-PERFORATING APPARATUS
Filed June 17, 1954  4 Sheets-Sheet 2

Inventor
Andrew G. Brown
by W. Bartlett Jones,
Attorney

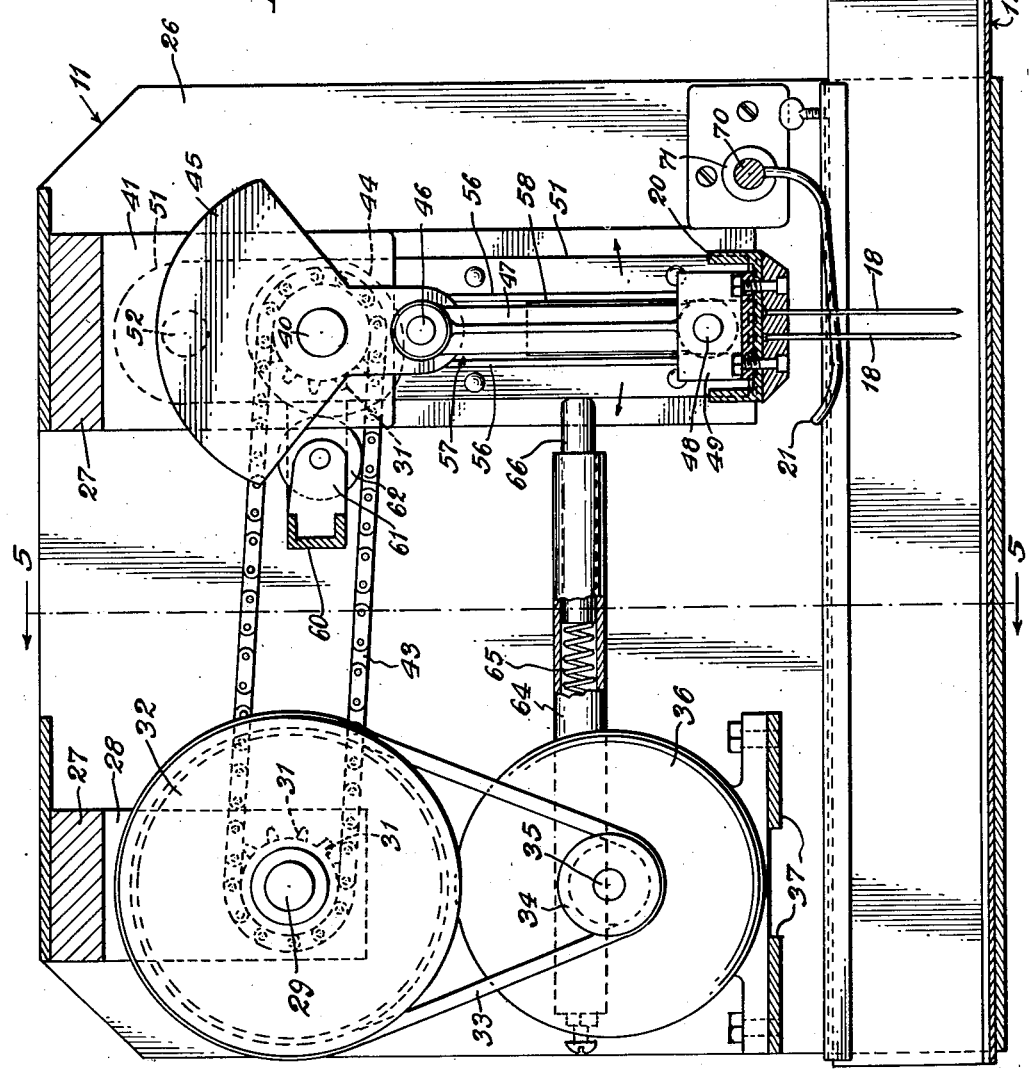

Dec. 17, 1957      A. G. BROWN      2,816,320
MEAT-PERFORATING APPARATUS
Filed June 17, 1954      4 Sheets-Sheet 4
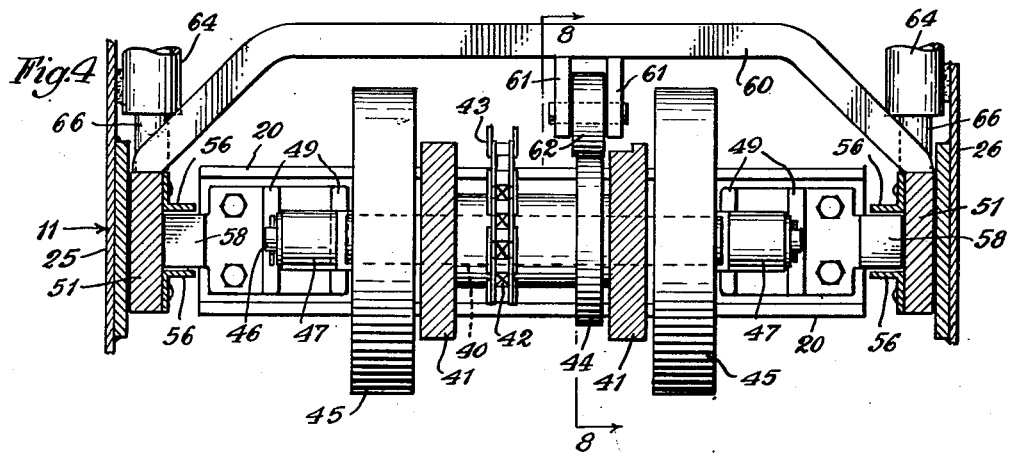
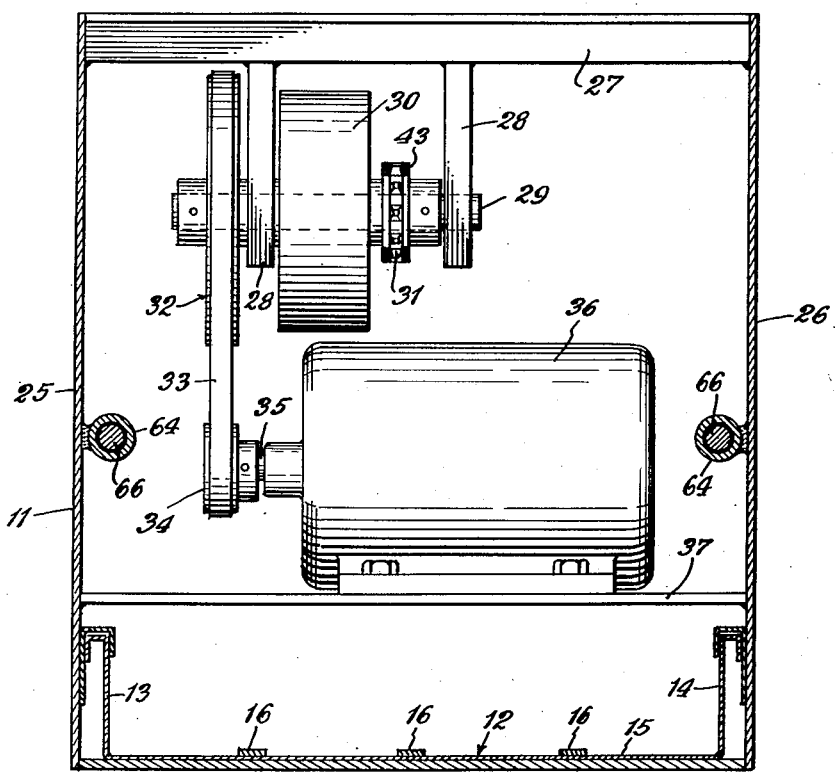
Inventor
Andrew G. Brown
by W. Bartlett Jones,
Attorney

United States Patent Office 2,816,320
Patented Dec. 17, 1957

2,816,320

MEAT-PERFORATING APPARATUS

Andrew G. Brown, Maywood, Ill., assignor to The Griffith Laboratories, Inc., Chicago, Ill., a corporation of Illinois Application June 17, 1954, Serial No. 437,413

5 Claims. (Cl. 17—25)

The present invention relates generally to apparatus for meat processing, and in particular to apparatus for perforating meat.

The apparatus is adapted for well-known methods of tenderizing meats by continuous insertion and withdrawing of suitable cutting tools for the purpose, but it is especially designed for forming a pattern of artificial pores in meat for use in meat-treating processes. It has special reference to processes of curing pork bellies on a large scale in packing plants. In such operations, a great number of raw chilled pork bellies are fed to the machine, perforated in and by the machine which automatically advances the belly through the machine, and then the resulting perforated pieces having newly formed open pores are suitably processed by treatment utilizing the pores as channels for entry of curing or other treating material.

It is the general object of the invention to provide small compact apparatus that may be easily moved from one bench to another.

It is another object of the invention to provide apparatus of the kind described which may be readily cleaned and maintained in sanitary condition.

It is another object of the invention to provide perforating apparatus which may be readily operated by a single individual and which may act correspondingly fast for such purpose.

Various other and ancillary objects and advantages of the invention will become apparent from the following description and explanation of the invention as set forth in connection with the accompanying drawings in which:

Fig. 1 is a pictorial rear view of the apparatus.

Fig. 3 is a vertical cross section of the apparatus taken on the line 3—3 of Fig. 2.

Fig. 4 is a partial horizontal section of the rear portion of the machine taken on the line 4—4 of Fig. 2.

Fig. 5 is a vertical cross section looking toward the forward end taken on line 5—5 of Fig. 3.

Fig. 6 is a detailed reduced view of the guiding means taken on the line 6—6 of Fig. 2.

Fig. 7 is a modification showing a substitute for the guiding means of Fig. 6.

Figure 2:
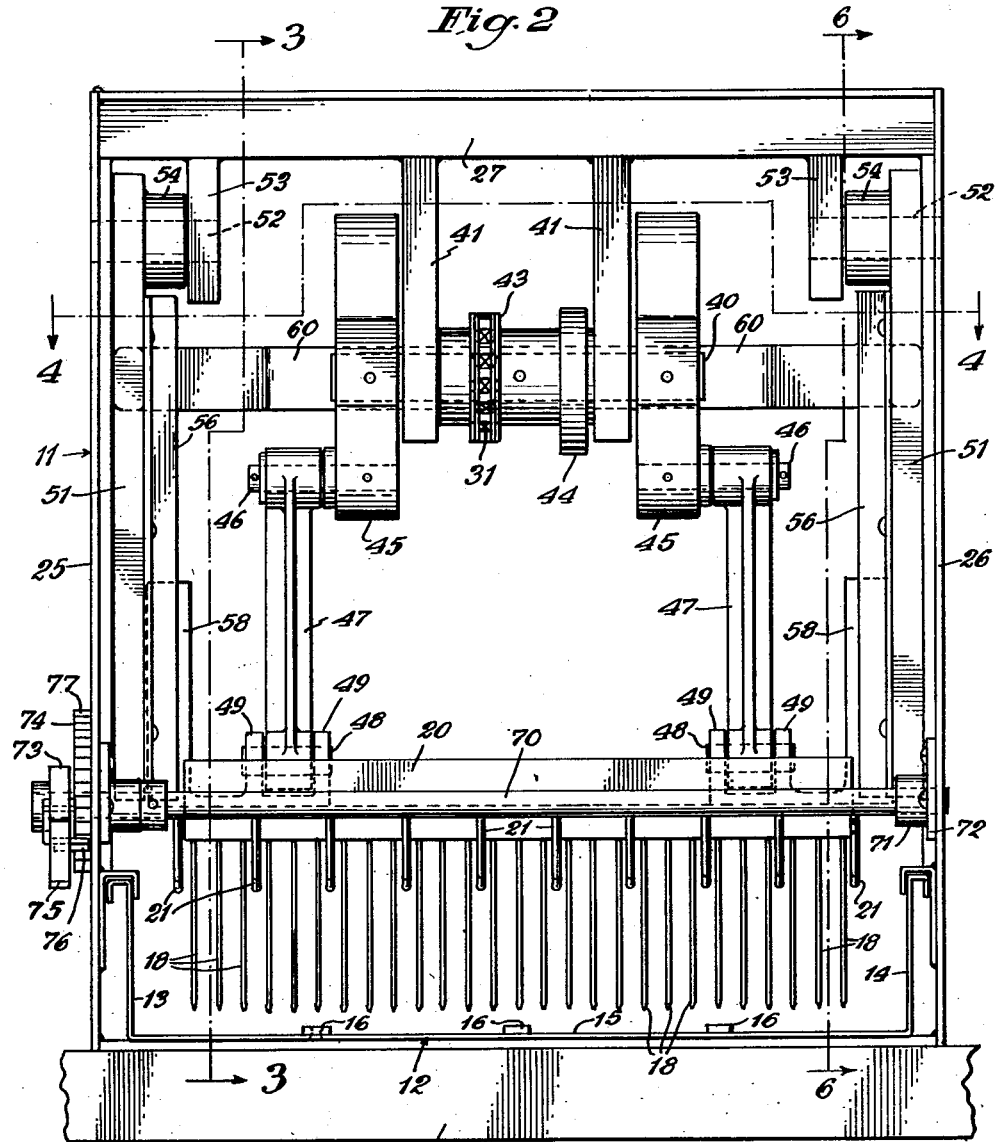
Fig. 2 is an enlarged rear elevation of the apparatus as seen in Fig. 1.

The apparatus relates to means for perforating meat by cyclically operating tools entering the meat, advancing the meat by moving the entered tools, withdrawing the tools and moving the withdrawn tools back to penetrating position to repeat the cycle here described. Such general action is old in using cutting tools to tenderize steaks and the like, and the apparatus of the present invention is useful for such purpose when such cutting tools are employed. However, in machines designed especially for tenderizing, the action of the tools within the meat has been purposely such as to effect relative movement of the tool in the meat to cut fibers therein as destinguished from merely entering a sharp tool and withdrawing it. The present invention is useful for using sharp tools to tenderize meat, but is more specially designed to minimize or avoid relative movement of the tool in the meat other than movement of insertion and withdrawal. Thus, when the tools are in the form of pointed pins of rounded side walls, the apparatus may be used to make artificial pores into the meat without cutting action.

When the meat piece is chilled, its plasticity is so much less than when it is at a more elevated temperature that a hole or pore may be made of such size that it does not close while such chill temperature is maintained, and yet the hole may be of such size that it will close in later processing. For example, when the meat piece is a chilled pork belly such pores may be made at a multiplicity of locations for use in a curing operation. A pork belly or other piece of meat so made artificially porous may be immersed in brine for curing, or it may be spread with dry water-soluble meat processing material in the conventional manner of "dry salt cures." In so doing, and especially with pork bellies, the juices of the meat piece readily dissolve the salt or other components so applied forming a solution which enters the pores and diffuses therefrom into the meat piece. Such a salt-curing process is well known for pork bellies and other meat pieces. In the case of pork bellies, the pores so formed preferably terminate within the belly and inwardly from one face which face is preferably one retaining the skin, so that in curing the bellies in a packing establishment they may be stacked vertically, each belly being covered with that amount of curing composition needed for its own cure.

To maintain a standardized cure in the case of pork bellies, the bellies should be similarly perforated, that is, the pattern of holes should be standardized in depth and spacing. The apparatus of the present invention operates automatically to effect a standard pattern. The apparatus is so organized that only one operator is needed for the machine. He merely feeds a pork belly to the machine which then advances it through the machine to make room for receipt of a following piece. For this purpose, the machine is power operated and runs in repeating cycles with or without a meat piece undergoing treatment.

The apparatus is represented pictorially in Fig. 1 as a unit to be mounted on any suitable bench 10. It has a framework or housing 11 and carried thereby a generally horizontal bed plate 12 in the form of a removable channel with side walls 13 and 14, and bottom 15 on which are mounted bearing or guiding ribs 16 to lessen sliding friction. The bed plate is easily removable like a drawer for cleaning. In Fig. 1 may be seen a bank of tools, which are preferably pointed cylindrical pins 18 shown entered into a pork belly B undergoing perforation. The bank of pins reciprocates in a generally vertical direction in repeating cycles and also in a generally horizontal direction in concurrent cycles. The two cyclical movements are so related that the pins enter the belly B at the rear of the machine while the bank is in its rearmost horizontal position. Then the bank moves forward while the pins are in the belly, thereby to advance the same. Then the pins withdraw and move back to rearmost position while out of the belly. In withdrawing the pins, the frictional engagement is sufficiently great, and desirably so, to lift the belly from the bed plate. The apparatus is designed to take advantage of such lifting. Lifting lessens the frictional sliding while advancing the piece of meat. Lifting maintains the pins more deeply inserted in the meat piece while the pins are moving in the upward stroke of the cycle of vertical reciprocation, thus tending less to bend the pins. Stripper means is provided preferably at a location well above the dropped position of the meat piece, but at a location to cause dropping of the meat piece before the pins start their rearward movement in the cycle of horizontal reciprocation.

The actions above referred to are illustrated in Fig. 6 (below Fig. 1) wherein the pins 18 are indicated as mounted in a crosshead 20. In full-line showing the pins are in the rearmost and downmost position, and in dotted-line showing they are in foremost position, but only partly raised to uppermost position. Between these extremes of horizontal position, the pins advance the meat and lift it toward stripper means 21 which holds the meat piece while the pins are withdrawn completely. Then the crosshead moves rearwardly again to its arrested rearmost position and the crosshead moves down in penetrating action to the position shown.

The crosshead 20 is mounted for substantially vertical reciprocation with relation to suitable guide means and the latter is arranged to move in a cycle for imparting to the crosshead its horizontal movements. The preferred construction is a horizontally swinging guide means coupled with cam means to control its movements and positions. For the vertical reciprocation of the crosshead, eccentric means is preferred, and thus eccentric means and the cam means may be mounted on a single power shaft to relate the two cycles as desired.

The housing 11 comprises two vertical side walls 25 and 26 with connecting cross bars 27 at the top. In brackets 28 suspended from forward cross bar 27 is an idler shaft 29 (Fig. 5) bearing a fly wheel 30, a sprocket 31 and a pulley 32 over which runs a belt 33 from a pulley 34 on shaft 35 of motor 36 mounted on a housing shelf 37. Across the rear and midway between side walls 25 and 26 is a crank shaft 40 (Figs. 2 and 4) bearing in brackets 41 depending from rear cross bar 27. Rigid on shaft 40 is sprocket 42 connected by chain 43 to forward sprocket 31, a cam 44, and at the shaft ends outside of brackets 41 two counter-balanced cranks 45. The cranks 45 have crank pins 46 bearing connecting rods 47 which also pivot on bearing pins 48 mounted between lugs 49 carried by the crosshead 20.

Figure 8:
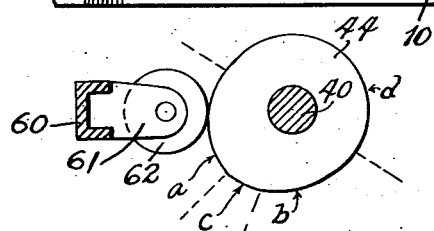
Fig. 8 is a detailed view of the cam to show its camming surfaces. This figure is taken on line 8—8 of Fig. 4.

Guide means for crosshead 20 is arranged to move the crosshead in a limited horizontal cycle of movement. Because a limited departure from perpendicular penetration and withdrawal of pins with respect to a pork belly is permissible, owing to the flexibility of the belly even when chilled, a simple swinging guide means movable in a small arc is provided. Just within the inner faces of each side wall 25 and 26 is a depending arm 51 of flat stock pivoted on co-axial pins 52 mounted in the adjacent side wall and in depending lug 53 alongside a spacing ring 54. The face of each arm 51 has two spaced angle irons 56 (see Figs. 1 and 4) secured to it forming between them a channel 57 in which slides a block 58 secured to and projecting upwardly from the crosshead 20. The two swinging bars 51 are interconnected and integrated as a guide unit by a forwardly extending yoke 60 (see Fig. 4) extending horizontally between the two stretches of chain 43 (Fig. 3) and at a location facing cam 44. Yoke 60 has bracket lugs 61 in which bears a cam-riding wheel 62 resting on the forward face of cam 44. The cam and its rider 62 control the position of the guiding means in conjunction with spring means normally urging the guide means to its rearmost position. Welded to each side wall is a hollow cylinder 64 aimed at its respective swinging arm 51. Each cylinder 64 contains within it a compression spring 65 and a plunger 66 forced by the spring against the side edge of arm 51. The cam 44 may vary greatly in its contour to regulate the movements and control the position of the movable guide means. Preferably it consists of two opposite concentric circular portions of the periphery with different diameters against each of which the cam rider remains stationary during a portion of the revolution of power shaft 40, so that the guiding means is arrested at each of its extreme horizontal positions. Thus, the cam has non-radial connecting portions of the periphery which act upon the cam rider 62 to move the guiding means forward with a power push in advancing the meat during penetration, and in allowing the spring 65 to move the guiding means to rearmost position after release of the meat by the stripper means. Fig. 8 shows the cam 44 with its eccentric portions designated a for the forward stroke, and b for the rearward stroke, and with the intermediate concentric inactive portions designated c and d. The eccentric portion a moves the tools, and thereby the meat, with power in the forward stroke, but quickly in a small fraction of the cycle time. The circular portion c, which may vary in length upwardly from zero, predetermines the time of rest from mere reversal to halting at the forward extreme position. The eccentric portion b permits the springs 82 to move the guide means to rearward position while the tools are out of the meat and are completing the cycle for a new penetration. The extended circular portion d of the cam holds the guide means at the rearmost position while the tools penetrate substantially to lowermost position, and then they begin to withdraw as they move the meat forward again by eccentric cam portion a. Accordingly, the cam section d, as shown, results in the meat piece resting on the bed plate for more than half the time in the cycle, being thus at rest while the tools move only to penetrate and while the swinging guide means rests in its rearmost position.

Reference has been made briefly to the stripper means as shown in Fig. 6. It consists of a plurality of fingers 21 which lie between pins 18. The fingers are rigidly mounted in a shaft 70 which has one bearing 71 in a plate 72 secured to side wall 26 and a bearing by projection through side wall 25 for means to adjust the rotary position of said shaft 70 whereby to tilt the fingers 21. As they are positioned in Fig. 3 and Fig. 6, the fingers are generally in the uppermost position of the stripper from which they may be lowered by turning the shaft 70 counter-clockwise in Figs. 1 and 3. The end of shaft 70 bears an arm 73 rigid with it adjacent a fixed notched arcuate plate 74 secured to side wall 25. On said arm is pivoted a spring pressed finger 75 bearing a tooth 76 for engagement in one of the notches 77 to fix the adjustable position of the stripper means. In Fig. 1 an open latticework plate 78 is shown rearwardly of the shaft 70 merely as a safety device to prevent the operator inadvertently getting his hands into the space for receiving the piece of meat to be perforated.

Fig. 7 shows a more ideal construction for the guiding means so arranged that the entire guiding means remains vertical, to keep the pins 18 vertical, and moves only in truly horizontal cycle of reciprocation. Rather than mounting the arms 51 for swinging through a small arc, similar arms 51ª each have two integral horizontal arms extending forward as plungers 80 entering horizontal cylinder 81 containing compression springs 82.

In operation the motor 36 effects constant reciprocation of the crosshead 20 in a vertical direction by the eccentric structure of the cranks, while at the same time the cam 44 on the power shaft 40 causes the guiding means to move between its two extreme horizontal positions of rest. As this is going on, a piece of meat, such as a pork belly, is inserted into the space between the bed plate 12 and the protective latticework plate 78 until the pins 18 enter it in a substantially vertical direction. When the pins 18 are substantially fully inserted, the crosshead moves forwardly carrying the piece of meat with it, and at the same time the pins rise to a limited extent to the time when the crosshead is in its forward horizontal position of rest. At this position the pins have advanced and lifted the belly to the stripping means 21, where it is held against lifting as the pins completely withdraw. When the pins are thus free of the piece of meat, the cam 44 permits the spring 65 to urge the guiding means back to rearmost position to repeat the cycle.

It is noted that two rows of pins 18 are shown. These are spaced apart a distance in agreement with the extent of forward motion in each cycle so that the pattern of holes formed is regular, and preferably such that the holes are spaced apart the same amount across the belly as along the belly. However, this is a matter not material to the final result.

The pieces of meat are suitably removed from the machine and cured, such acts forming no part of the present invention.

Various changes and modifications in structure may be made without departing from the spirit and scope of the invention as set forth in the appended claims.

I claim:

1. Apparatus comprising a frame, a generally horizontal bed plate fixed relative to the frame on which slidingly to support a piece of meat, a crosshead mounted in said frame for reciprocation above said bed plate and generally perpendicular thereto, meat-piercing tools carried by said crosshead in a bank extending across said bed plate and positioned to enter a piece of meat on said bed plate, a rotary operating shaft mounted in said frame, eccentric means on said shaft operatively connected to said crosshead for reciprocating it in a direction generally perpendicular to said bed plate, swinging guide means for said crosshead pivoted on a horizontal axis to said frame adjacent its upper end, cam means on said shaft operatively associated with said guide means to effect horizontal swing of said guide means on its pivotal axis, said cam means having a first portion providing no camming action in a first extreme of the arc of swing of the guide means at which time the eccentric means effects a downward movement of the crosshead with penetration of the meat, a second portion operable to cam the guide means forward to the second extreme in the arc of swing while the eccentric means lifts the crosshead in withdrawing the tools from the meat and while moving the meat in the forward direction by the tools, a third portion providing no camming action for limiting the forward movement of the guide means and of the meat moved by the tools, and a fourth portion operable to cam the guide means to its rearmost horizontal position while the eccentric means moves the tools from withdrawing position to penetrating position, and stripper means carried by said frame, said stripper means being located in a position above the normal level of the meat on said bed plate and below the lower ends of the tools in their uppermost position whereby to free the meat from the tools.

2. Apparatus comprising a frame, a generally horizontal bed plate fixed relative to the frame on which slidingly to support a piece of meat, a crosshead mounted in said frame for reciprocation above said bed plate and generally perpendicular thereto, meat-piercing tools carried by said crosshead in a bank extending across said bed plate and positioned to enter a piece of meat on said bed plate, a rotary operating shaft mounted in said frame, eccentric means on said shaft operatively connected to said crosshead for reciprocating it in a direction generally perpendicular to said bed plate, cyclically movable guide means for said crosshead mounted in said frame and arranged for substantially horizontal movement of said guide means and crosshead, cam means on said shaft operatively associated with said guide means to effect said horizontal movement of said guide means and crosshead, said cam means having a first portion providing no camming action in a first extreme horizontal position of the guide means at which time the eccentric means effects a downward movement of the crosshead with penetration of the meat, a second portion operable to cam the guide means forward to the second extreme horizontal position while the eccentric means lifts the crosshead in withdrawing the tools from the meat and while moving the meat in the forward direction by the tools, a third portion providing no camming action for limiting the forward movement of the guide means and of the meat moved by the tools, and a fourth portion operable to cam the guide means to its rearmost horizontal position while the eccentric means moves the crosshead and the tools from withdrawing position to penetrating position, and stripper means carried by said frame, said stripper means being located in a position above the normal level of the meat on said bed plate and below the lower ends of the tools in their uppermost position whereby to free the meat from the tools.

3. Meat perforating means comprising in combination a framework, a generally horizontal bed carried by said framework on which slidingly to advance a piece of meat, a crosshead mounted within said framework and movable over said bed plate in a substantially vertical cycle of reciprocation and in a substantially horizontal cycle of reciprocation, a bank of substantially vertical meat-penetrating tools carried by said crosshead crosswise of said bed plate, first means in said framework to reciprocate said crosshead vertically in repeating cycles, second means operatively associated with said first means to move said crosshead horizontally in concurrent repeating cycles of shorter duration than that of the vertical cycle, said second means being arranged to effect a period of rest at at least one of the horizontal extremes of the shorter-time cycle, said first means being arranged to effect a down-stroke of the crosshead for penetration of meat by said tools during said one period of rest in the horizontal cycle and to make an incomplete up-stroke while said second means effects movement of the crosshead toward the second horizontal extreme, whereby said partial up-stroke by friction of the tools tends to lift a piece of penetrated meat and move it horizontally, and stripper means positioned in said framework to strip the meat from the tools during the up-stroke of the crosshead, whereby said crosshead may move from the second to the first horizontal position of rest while the tools are free from penetration.

4. Meat perforating means comprising in combination a framework, a generally horizontal bed carried by said framework on which slidingly to advance a piece of meat, a crosshead mounted within said framework and movable over said bed plate in a substantially vertical cycle of reciprocation and in a substantially horizontal cycle of reciprocation, a bank of substantially vertical meat-penetrating tools carried by said crosshead crosswise of said bed plate, first means in said framework to reciprocate said crosshead vertically in repeating cycles, second means operatively associated with said first means to move said crosshead substantially horizontally in concurrent repeating cycles, said second means being operable to hold said crosshead at one horizontal extreme while said first means effects a down-stroke and penetration of the meat on said bed plate, and said second means being operable to move said crosshead to the second extreme horizontal position while said first means is effecting the up-stroke of the crosshead and withdrawal of the tools from the meat, stripper means positioned in said framework to hold the meat against upward movement resulting from friction of the tools with the meat while said tools are withdrawn from the meat, and said second means being operable to move said crosshead from the second extreme position to the first extreme position while the tools are free from the meat.

5. Apparatus comprising a frame, a generally horizontal bed plate fixed relative to the frame on which slidingly to support a piece of meat, a crosshead mounted in said frame for reciprocation above said bed plate and generally perpendicular thereto and for simultaneous reciprocation substantially horizontally, meat-piercing tools carried by said crosshead in a bank extending across said bed plate and positioned to enter a piece of meat on said bed plate, power means in said frame operatively associated with said crosshead to reciprocate it substantially vertically in repeating cycles, rotary cam means connected with said power means and arranged to move and control the position of said crosshead in its horizontal reciprocation, said cam having a cycle of rotation coincident with the cycle of vertical reciprocation of said crosshead, said cam having a non-camming portion operable to hold said crosshead stationary at one horizontal extreme while said crosshead is uppermost and moves downwardly and said tools penetrate a piece of meat on said bed plate, said cam having a following camming portion operable to move said crosshead to its second extreme horizontal position during only the initial portion of the up-stroke of said crosshead, said cam having a following non-camming portion operable to hold the crosshead in said second extreme position during a following portion of the up-stroke of the crosshead and until the meat is stripped from the tools by the below-mentioned stripping means, and said cam having a following and closing camming portion operable to move the crosshead from said second to said first extreme position while the ends of said tools are above the top of a piece of meat resting on said bed plate to be pierced by the next down-stroke of the crosshead, and tool-passing stripper means carried by said frame and located below the path of said tools during motion of the crosshead from said second to said first extreme position and located in the upward path of the meat as lifted by said tools in the up-stroke of the crosshead.

References Cited in the file of this patent

UNITED STATES PATENTS

| | | |
|---|---|---|
| 1,986,074 | Spang | Jan. 1, 1935 |
| 2,302,701 | Lang | Nov. 24, 1942 |
| 2,323,769 | Hansen | July 6, 1943 |
| 2,408,747 | Ahrndt | Oct. 8, 1946 |

FOREIGN PATENTS

| | | |
|---|---|---|
| 13,247 | Great Britain | 1912 |